United States Patent
Bestmann

(10) Patent No.: US 8,537,420 B2
(45) Date of Patent: Sep. 17, 2013

(54) METHOD FOR GRAY BALANCE CORRECTION OF A PRINTING PROCESS

(75) Inventor: Günter Bestmann, Altenholz (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 364 days.

(21) Appl. No.: 13/070,792

(22) Filed: Mar. 24, 2011

(65) Prior Publication Data

US 2011/0235073 A1    Sep. 29, 2011

(30) Foreign Application Priority Data

Mar. 24, 2010  (DE) .......................... 10 2010 012 672

(51) Int. Cl.
*H04N 1/60* (2006.01)

(52) U.S. Cl.
USPC ............ 358/1.9; 358/504; 358/2.1; 358/3.01; 358/518; 399/39

(58) Field of Classification Search
USPC ................. 358/1.9, 2.1, 3.01, 3.02, 518, 504; 399/39
See application file for complete search history.

(56) References Cited

U.S. PATENT DOCUMENTS

| | | | |
|---|---|---|---|
| 5,023,812 A | | 6/1991 | Pfeiffer |
| 5,068,810 A | | 11/1991 | Ott |
| 5,469,276 A | * | 11/1995 | Shu .................................. 358/1.9 |
| 5,604,567 A | * | 2/1997 | Dundas et al. ................... 399/39 |
| 6,204,873 B1 | * | 3/2001 | Shimazaki ..................... 358/518 |
| 6,230,622 B1 | * | 5/2001 | Dilling .......................... 101/484 |
| 7,312,893 B2 | | 12/2007 | Bestmann et al. |
| 2006/0285134 A1 | * | 12/2006 | Viturro et al. .................. 358/1.9 |
| 2007/0199463 A1 | | 8/2007 | Schonert |
| 2009/0015855 A1 | | 1/2009 | Bestmann |

FOREIGN PATENT DOCUMENTS

| | | |
|---|---|---|
| DE | 3913382 C2 | 12/1995 |
| DE | 10226563 A1 | 1/2003 |
| DE | 102005041181 A1 | 5/2007 |
| DE | 102008031735 A1 | 1/2009 |
| EP | 0408507 A1 | 1/1991 |
| EP | 0421003 A1 | 4/1991 |
| EP | 1279502 B1 | 8/2007 |

* cited by examiner

*Primary Examiner* — Kimberly A Williams

(74) *Attorney, Agent, or Firm* — Laurence A. Greenberg; Werner H. Stemer; Ralph E. Locher

(57) ABSTRACT

In printing processes, even when a process calibration under predefined printing conditions is used, it is possible for deviations in the gray balance to occur. Attempts have been made to correct the deviations, for example by changing the layer thickness of the printing inks in the printing process, but that can lead to color deviations in other regions. A gray balance correction method with which wastage that regularly occurs can be reduced and an occurrence of undesired color fluctuations can be avoided, is achieved by using differences between black and chromatic gray areas in gray balance areas to replace the measured values from a first process calibration with corrected measured values and carrying out a new process calibration.

6 Claims, 3 Drawing Sheets

METHOD FOR GRAY BALANCE CORRECTION OF A PRINTING PROCESS

CROSS-REFERENCE TO RELATED APPLICATION

This application claims the priority, under 35 U.S.C. §119, of German Patent Application DE 10 2010 012 672.1, filed Mar. 24, 2010; the prior application is herewith incorporated by reference in its entirety.

BACKGROUND OF THE INVENTION

Field of the Invention

The present invention relates to a method for correcting the gray balance of a printing process, in which printing forms allocated to color separations are imaged with at least one test form and at least one printing material is printed in a printing press through the use of the printing forms and the test form printed onto the printing material is measured colorimetrically. In that case, the test form should include at least one gray balance area. That gray balance area should have at least one chromatic gray area and one black area, which share the gray balance area. The chromatic gray area is built up exclusively from colored printing inks, which should be overprinted in accordance with a first tonal value combination. That first tonal value combination should have first tonal values of the colored inks in a combination according to a first predefined color profile, so that the intended color value of that chromatic gray area corresponds to the same intended color value as the corresponding black area of the gray balance area. In that case, the color values are based on a device-independent color space, preferably the CIELab color space.

The gray balance is defined as a set of tonal values for colored process colors, such as cyan, magenta and yellow (CMY), for which the printing results in a neutral color under defined viewing conditions. The predefined printing conditions for that purpose are defined in that case, for example, in process standards, such as the offset printing process standard or the Medien Standard Druck (Printing Media Standard) of the BVDM (Federal Print and Media Association). They are in turn based on stipulations from the corresponding ISO standard, such as ISO 12647-2:2004. The viewing conditions are likewise standardized by the ISO.

The printing processes which are considered are, for example, offset printing or gravure printing. Digital printing processes, such as electrophotographic or other "non-impact" printing processes, are also possible.

In those printing processes, in reproduction technology, printing originals for printed pages are produced which contain all of the elements to be printed such as text, graphics and images. In the case of the electronic production of the printing originals, those elements are present in the form of digital data. In the case of an image, the data is produced, for example, by the image being scanned point by point and line by line in a scanner, with each image point being broken down into color components and the color components being digitized. Images are usually broken down in a scanner into the color components red, green and blue (RGB), that is to say into the components of a three-dimensional color space. For a colored print, however, other color components are needed. In that case, in general different colored printing inks and black can be used in order to produce a corresponding colored printed image on a printing material. In the case of four color printing, those are the printing inks cyan, magenta, yellow and black (CMYK), that is to say the components of a four dimensional color space. For that purpose, the image data from the RGB color space of the scanner are transformed into the CMYK color space of the printing process to be used.

During that transformation, each color value is assigned a combination of the process colors, i.e. the printing inks of the output color space. Each process color is assigned its own printing original, a so-called color separation. For offset printing, printing plates are produced from the individual color separations.

In order to produce the printing plates, firstly films can be exposed and then the printing plates can be imaged through the use of those films. In current digital imaging methods, the printing plates assigned to the individual color separations are produced by exposing the same in a plate exposer. For that purpose, through the use of a so-called raster image processor (RIP), firstly a digitally screened bitmap is generated which indicates which points on the printing plate should be exposed and which should not. Each color value to be produced is assigned a tonal value of the corresponding color separation by the RIP. For instance, the predefined color values can be represented by the color components CMYK digitized with 8 bits. This means that each color component of the process colors is assigned 256 tonal value stages. The tonal value of a screen dot is determined in that case by the number of exposer pixels imaged in the screen cell assigned to the screen dot. A screen cell includes, for example, 256 possible individual pixels. Depending on how many of those pixels are exposed in a screen cell on a printing plate, the result is a tonal value from 0 to 100% for that screen dot.

In order to produce specific tonal values through the use of the different color separations, the tonal value combinations of the process colors which correspond to the predefined color values are stored in a color profile. In order to reduce the size of a corresponding look-up table, not all of the possible combinations of the color components CMYK are stored but only the value combinations for a coarse regular grid of intersections in the CMYK color space. For CMYK value combinations which lie between the grid points and for corresponding color values of a device-independent color space, such as the CIELab color space, the tonal value combinations or color values sought are interpolated from the adjacent intersections.

Since there is a number of CMYK color value combinations which correspond to a single color value of the device-independent color space, there are also different possible ways of storing a corresponding profile for the assignment in order to obtain an unambiguous assignment of color values and tonal value combinations.

On the other hand, not only is there a need to produce the color values in a specific way through the use of tonal value combinations of the process colors in a printing process, but the problem is also posed that, depending on the equipment used, inks and other boundary conditions, the tonal values actually produced on the printing material in the printing process deviate from the predefined intended values. German Published Patent Application DE 102 26 563 A1 therefore discloses a method of producing, before the production of printing plates, test printing forms which have test forms that are assigned to specific intended tonal values and formed by different tonal value combinations. On the basis of the exposure of corresponding test printing forms and use in a specific printing process, by measuring the test forms produced on the printing material, a relationship between the actual tonal values produced and the predefined intended tonal values can be produced, and the assignment of the tonal values of the process colors to the intended tonal values in accordance with a tonal value characteristic curve for the imaging of printing forms for that printing process, corrected in a process calibration, can be stored or deposited.

In the predefined color profile, the tonal value gains according to the process calibration for a predefined printing condition are taken into account. In that case, the printing condition contains the information about the printing inks being used and the papers being used in the printing process described. For instance, characterization data can be provided in accordance with FOGRA39 for the printing condition: offset paper type 1+2 glossy and matte coated paper with tonal value gain curves A(CMY) and B(K). To this end, an appropriate color profile is provided which takes into account the tonal value gains for the corresponding paper type and the corresponding printing inks in the offset print.

Furthermore, it is possible to control fluctuations and deviations in a printing process through the use of pre-settings or re-adjustments of inking zone screws. By using the latter, the layer thickness of a process color can be varied manually within limits, in order to achieve adaptation of the actual tonal values to the desired intended tonal values in this way and still during the printing process, without re-imaging printing plates.

If, now, a corresponding tonal value characteristic curve for the imaging of a printing form is stored and there is an assignment of intended tonal values to specific tonal value combinations according to a printing process, then the printing plates are imaged in accordance with the individual color separations and inserted into a printing press.

In order to check the inking and the register, the printing plates being used are imaged with further test forms in edge regions or between individual pages and/or appropriate process control strips with different colored areas are provided. European Patent EP 1 279 502 B1 provides a gray balance area, for example, in which a screened area of the black ink (K) with a coverage of 40% is assigned directly to a colored area of the other printing inks (CMY) which, according to a color profile, should have the same gray color value as the 40% K area. If deviations of the gray color values from the chromatic gray area and the black area of that gray balance area can be detected visually, then a densitometric measurement of further full-tone areas is suggested for more accurate checking.

Furthermore, such a gray balance area can also be measured colorimetrically. If it is determined in that case that the actual color values do not correspond to the intended color values, then the inking zone screws are readjusted and the layer thickness of the corresponding process color is increased or reduced. As a result, however, both the full-tone inking of the corresponding process color and the corresponding tonal value gains, and therefore the overprinting response overall, is changed. Through that change in the layer thickness, it is only possible for a desired effect to be achieved within limits in order to bring the actual values close to the intended values, since all of the color values change globally. Thus, for instance, it may be desirable in particular to correct the gray balance in one tonal value region but, undesirably, a new color error is also produced in another tonal value area as a result.

For instance, in order to counteract a red color error in the quarter-tone range, it may imply increasing the layer thickness of cyan and reducing that of yellow and magenta. As a result, the colors and tonal value gains of the process colors involved increase or decrease. The error in the gray reproduction in the quarter-tone range is corrected by that measure but it is possible for a displacement of the gray reproduction in the three-quarter tone to occur. At the same time, the error in the color values and the tonal value gain is increased.

As a result of that correction by layer thickness variation, compromises resulting from the production of other errors or discolorations therefore have to be tolerated. Secondly, those corrections have to be made again during each printing operation.

Especially if, in a print shop, different papers and/or different printing inks are used than were present for the production of the calibration characteristic curve then, despite correctly set inking and correctly calibrated tonal value gain, differences in the gray reproduction result.

Although they can be compensated for by the layer thickness variation described, other undesired errors and, in addition, regularly occurring wastage when starting printing, occur.

A further correction method for the gray balance is proposed in German Published Patent Application DE 10 2008 031 735 A1, corresponding to U.S. Patent Application Publication No. US 2009/0015855 A1. There, chromatic gray areas are printed in a process control strip. A first chromatic gray area contains a tonal value combination of the colored printing inks which, according to predefined conditions, corresponds to the specific gray value. Other chromatic gray areas are disposed adjacently, in which the tonal value combination corresponds substantially to that of the first chromatic gray area, with an individual colored printing ink being varied slightly in each case. Through the use of colorimetric measurement of the individual chromatic gray areas, that chromatic gray area which lies closest to the gray axis of a device-independent color space can be determined. In that way, at least tonal value combinations of some of the colored printing inks which result in the closest possible gray value in the color space are determined. However, the lightness difference between a desired gray value and the actually printed gray value is not also taken into account.

In the method described, it is particularly problematic if papers are used in the actual printing which, although they nominally correspond to the papers from the predefined printing condition of the color profile, nevertheless have different hues. The same is true of the black printing ink used which, in general, also exhibits a color error. The corresponding colorimetric measurement of the chromatic gray areas therefore firstly does not take into account the visual sensation of a corresponding black area on the same printing material, nor any possible lightness difference between a black control area and a chromatic gray area with the same intended gray value.

SUMMARY OF THE INVENTION

It is accordingly an object of the invention to provide a method for gray balance correction of a printing process, which overcomes the herein aforementioned disadvantages of the heretofore-known methods of this general type and with which regularly occurring wastage can be reduced and an occurrence of undesired color fluctuations can be avoided.

With the foregoing and other objects in view there is provided, in accordance with the invention, a method for correcting the gray balance of a printing process, in which printing forms allocated to color separations are imaged with at least one test form. The method comprises printing at least one printing material in a printing press with the printing forms, using at least three colored printing inks and a black printing ink, colorimetrically measuring the test form printed onto the printing material, with the test form including at least one gray balance area having a chromatic gray area and a black area and the chromatic gray area being formed from the colored printing inks in accordance with a first tonal value combination, providing the first tonal values of the chromatic inks in the combination according to a first predefined color profile with the same intended color value as the black area, and creating the first predefined color profile in accordance with a predefined first printing condition of a predefined printing process following a first process calibration. The invention is distinguished by determining actual color values of the black area and of the chromatic gray area of the at least one gray balance area, determining a second tonal value combination of the printing inks in accordance with the first predefined color profile by using the actual color value of the black area, determining a third tonal value combination of the printing inks in accordance with the first predefined color profile by using the actual color value of the chromatic gray area, determining first measured values of the first predefined process calibration corresponding to predefined tonal values, while taking the first printing condition into account, determining corrected measured values for at least a part of the first measured values, by using the second and third tonal value combinations, replacing at least the part of the first measured values with the corrected measured values, and carrying out a second process calibration by using the corrected measured values and taking the printing condition of the predefined printing process into account, and imaging printing forms in an imaging process according to the second process calibration for a substantially identical printing condition.

Thus, according to the invention, printing forms assigned to color separations are imaged with at least one test form, at least one printing material is printed in a printing press through the use of the printing forms and the printed test form is measured colorimetrically.

In a printing process, the test form according to the invention is advantageously concomitantly printed in a non-imaged area of a conventional print job. These regions should also be understood in this case in particular that they cover the regions between two pages which are printed on one printed sheet. In this case, the test form includes at least one gray balance area. This gray balance area is divided in two, according to the invention, and is formed of a black area and a chromatic gray area, with the black area being formed only by the black color K. The chromatic gray area is formed by overprinting the various colored, i.e. not black, printing inks. In a printing process using four printing inks CMYK, these are the colored printing inks CMY. The black area is a screened area, the tonal value of which is predefined and, in accordance with a predefined first color profile which corresponds to the printing condition, is intended to result in a predefined intended color value on the printed sheet. A plurality of gray balance areas is preferably used in the test form. Tonal values of black in the region of 30, 50 and 70% are particularly preferred in this case. In general, tonal values for black in the lighter and more central regions are preferably used.

The chromatic colors of the chromatic gray area of the gray balance area are overprinted in accordance with tonal value combinations which, according to the predefined color profile, should result in the same intended color value as the black area. The intended color values from the chromatic gray area and from the black area are specified in a device-independent color space, preferably in the CIELab space, according to the first predefined color profile.

The first predefined color profile in this case is known from a test print, which is substantially independent of the method described herein. Such a color profile is provided, for example, by a supplier.

In a real, further printing process, the chromatic gray determined from the predefined color profile is never 100% accurate since, even within the same printing ink or the same type of paper, deviations in the color can result. Therefore, even in the case of the same intended color values for the black area and for the chromatic gray area, corresponding deviations will usually occur.

The invention provides for the actual color values of the black area and of the chromatic gray area of the at least one gray balance area to be determined. A color measuring instrument can preferably be used for this purpose.

The actual color values determined in this way are present in a device-independent color space, for example Lab. According to the first predefined color profile, by using the actual color values of the black area and the actual color values of the chromatic gray area, according to the invention first of all second and third tonal value combinations of the printing inks used are determined.

For the purpose of exactly determining tonal value combinations, a restriction is preferably made to pure combinations of the non-black printing inks. This is primarily advantageous for four-color printing CMYK, since the color locus in the device-independent color space is described by three coordinates. Even in the case of a multicolor print, it is always possible to choose three colored printing inks, the combinations of which enclose the gray axis of the color space. In a preferred method sequence, the appropriate tonal value combination of the chromatic gray area is determined from the measured actual color value, in that, firstly, a starting value on the side of the tonal value combinations is predefined and then the suitable tonal value combination is determined in an iterative process. This starting value can preferably be the combination (30%, 30%, 30%)=(CMY). Beginning from this starting value, the individual tonal values of the printing inks are then changed successively and iteratively in such a way that, according to the first predefined color profile, they correspond to the measured actual color value. In this way, for the actual color values of the black area and of the chromatic gray area, second and third tonal value combinations of the printing inks, particularly preferably only of the colored printing inks, in particular for a four-color process, are determined.

Furthermore, according to the invention, first measured values should be determined from the first predefined color profile. These first measured values result from predefined tonal values, with these resulting from a printing process with predefined printing conditions in an actual layer thickness of the printing inks being used, which in turn corresponds to the first measured values.

Through the use of the known process calibration and the printing conditions present for the first predefined color profile, it is therefore possible for the measured values of the predefined tonal values to be determined from the first process calibration. In particular, according to the invention, a number of first measured values are determined after the first process calibration and are assigned to the tonal values which, after the first process calibration, are used as a basis for the intended color values of the black area and chromatic gray area.

From these first measured values, i.e. at least for some of the first measured values from the predefined process calibration, corrected measured values are then determined, with these corrected measured values being determined on the basis of the second and third tonal value combinations being determined. For this determination of the corrected measured values, in a preferred embodiment, a difference between the second and third tonal value combinations is formed. For this purpose, the tonal value of a colored printing ink which is assigned to the actual color value of the black area is particularly preferably subtracted from the tonal value of the same colored printing ink which belongs to the actual color value of the chromatic gray area. This difference or the difference values formed in this way for the tonal values of the tonal value combination of the actual color value of the chromatic gray area are then added to the first measured values in a particularly preferred method step, so that a corresponding corrected measured value is created. This corrected measured value or the corrected measured values for the different colored printing inks replace the first measured values from the first process calibration or at least some thereof.

Starting from the differences which are determined, through the use of appropriate interpolation methods, calculated difference values or corrected measured values resulting therefrom can be determined for all the first measured values. The interpolation methods used should act as harmoniously as possible and not lead to jumps in the values. For instance, spline functions or polynomials can be used, which can also be patched onto one another. In this case, as boundary conditions, preferably for tonal values of 100% and 0%, no deviations should occur between the first and the corrected measured values.

The process calibration can then be adapted appropriately from these corrected measured values, while taking the printing condition into account, so that, in the following imaging process for printing forms, the characteristic curves of the printing process are optimized in relation to the gray balance.

It is also possible to use the adapted or second process calibration to produce a second color profile which, for example, can be used for proof prints while taking the corrected gray balance into account.

In order to calculate the first measured values from the first process calibration from the latter, in a preferred embodiment at least one of the items of information including the tonal value gain curve or tonal value curve of the process calibration is used for this purpose. In this way, by using the intended tonal value which is assigned to the process calibration, taking the tonal value gain curve or the tonal value curve into account, a corresponding first measured value is assigned which differs appropriately from the intended tonal value through the printing conditions.

Other features which are considered as characteristic for the invention are set forth in the appended claims.

Although the invention is illustrated and described herein as embodied in a method for gray balance correction of a printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
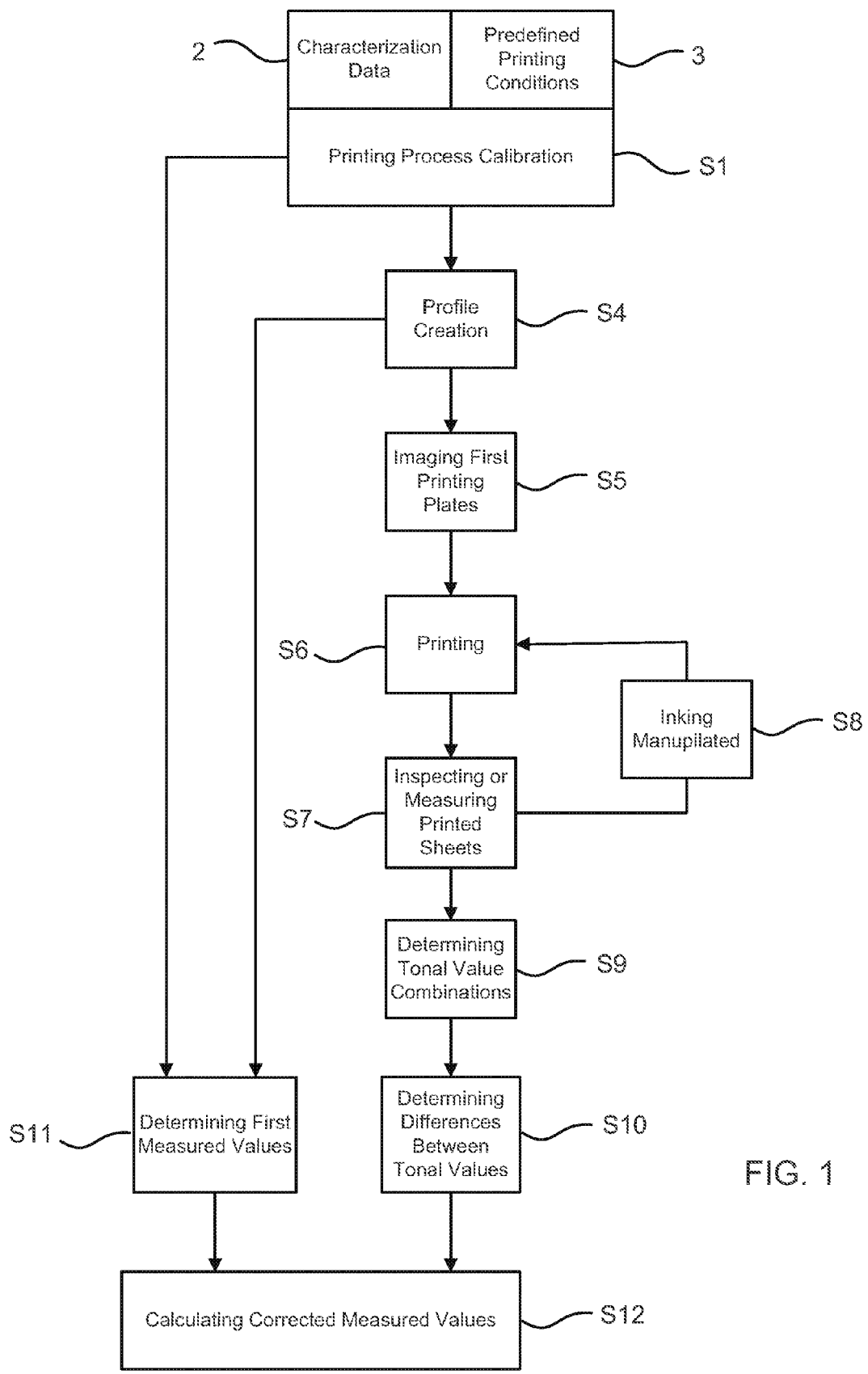
FIG. 1 is a flow chart of a gray balance correction method.
Figure 2:
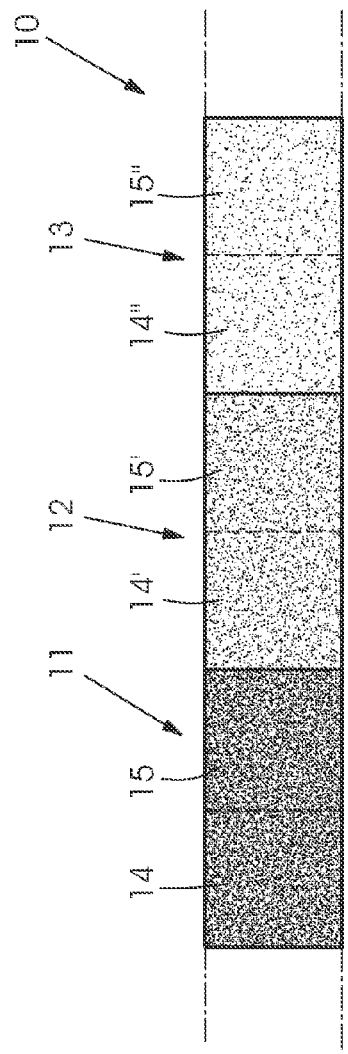
FIG. 2 is a diagrammatic, plan view of a portion of a process control strip with gray balance areas.

Referring now in detail to the figures of the drawings, in which a preferred embodiment of the method, to which the invention is not intended to be restricted and from which further features according to the invention may be gathered, is shown and first, particularly, to FIG. 1 thereof, there is seen a flowchart illustrating a gray balance correction according to the method of the invention. In step S1, a process calibration of a printing process and of predefined printing conditions 3 is carried out by using characterization data 2. This process calibration S1 leads to a profile creation S4, in which firstly a first color profile for the printing process is created. By using this first color profile, in step S5 imaging of first printing plates is carried out in accordance with color separations, which have been produced by a raster image processor. The color separations correspond to a printing original. The printing original is broken down by a raster image processor (RIP) into the individual printing inks and screened. This printing original is in each case assigned test forms in the form of process control strips. Through the use of these general process control strips, deviations in the color and in the half-tone of the subsequent printing image can be determined. In the sense of the invention, a control strip 10 shown in FIG. 2 contains chromatic gray and black or gray areas 14, 14', 14", 15, 15', 15", in which the tonal values of the chromatic gray areas of 14, 14', 14" are determined from the characterization data or the associated profile. These chromatic gray and black areas 14, 14', 14", 15, 15', 15" are constituent parts of gray balance areas 11, 12, 13 as illustrated in FIG. 2.

The imaging of the printing plates is generally carried out in a printing plate exposer. However, this imaging can itself also be carried out in a printing press. As an alternative to imaging printing plates, however, the color separations can also be formed on electrophotographic surfaces, or they can correspond to pre-definitions for an inkjet print.

Through the use of the printing plates which are imaged in this way, a printing process is carried out in a following step S6 in which, for example, prints are printed within a printing press.

In order to obtain an overview as to the quality of the printing process, printed sheets are inspected in step S7 and, if necessary, measured. In this case, in particular, colored areas of the process control strip 10 are first checked visually and, if appropriate, then measured colorimetrically through the use of a color measuring instrument. In accordance with the measured results or deviations in the inking obtained in this way, the inking in the printing process itself can be manipulated in a step S8. For this purpose, in particular the inking zone screws can be adjusted. In this way, changes in the ink layer thicknesses in individual inking zones of the printed image occur. Printing of sheets is carried out by using this changed setting of inking zone screws of the printing press, in step S6, whereupon an inspection or measurement of the process control strip or the entire printed image is once more carried out in step S7.

If the deviations in the inking, in particularly in the gray balance, are too high or, in successive printing processes with different printing originals, regular setting of the gray balance through the manipulation of the ink supply in step S8 is necessary. Then, in accordance with the method of the invention, following step S7, further method steps S9 to S12 and then S1 to S5 are provided, which allow the creation of new printing plates that permit an improved gray balance for the printing process in step S6.

For this purpose, in step S9, the colorimetrically measured gray balance areas 11, 12, 13 of the process control strip are used to determine tonal value combinations ($C_K$, $M_K$, $Y_K$), ($C_G$, $M_G$, $Y_G$) for the respective black area 15, 15', 15" and the associated chromatic gray area 14, 14', 14".

Combinations of the colored printing inks CMY are determined iteratively in each case in order to determine these tonal value combinations ($C_K$, $M_K$, $Y_K$), ($C_G$, $M_G$, $Y_G$), from the profile which was created in step S4 and from color loci $Lab_K$ and $Lab_G$ of the gray balance areas 11, 12, 13. In the present example, a four-color print using the printing inks CMYK is assumed.

Figure 3:
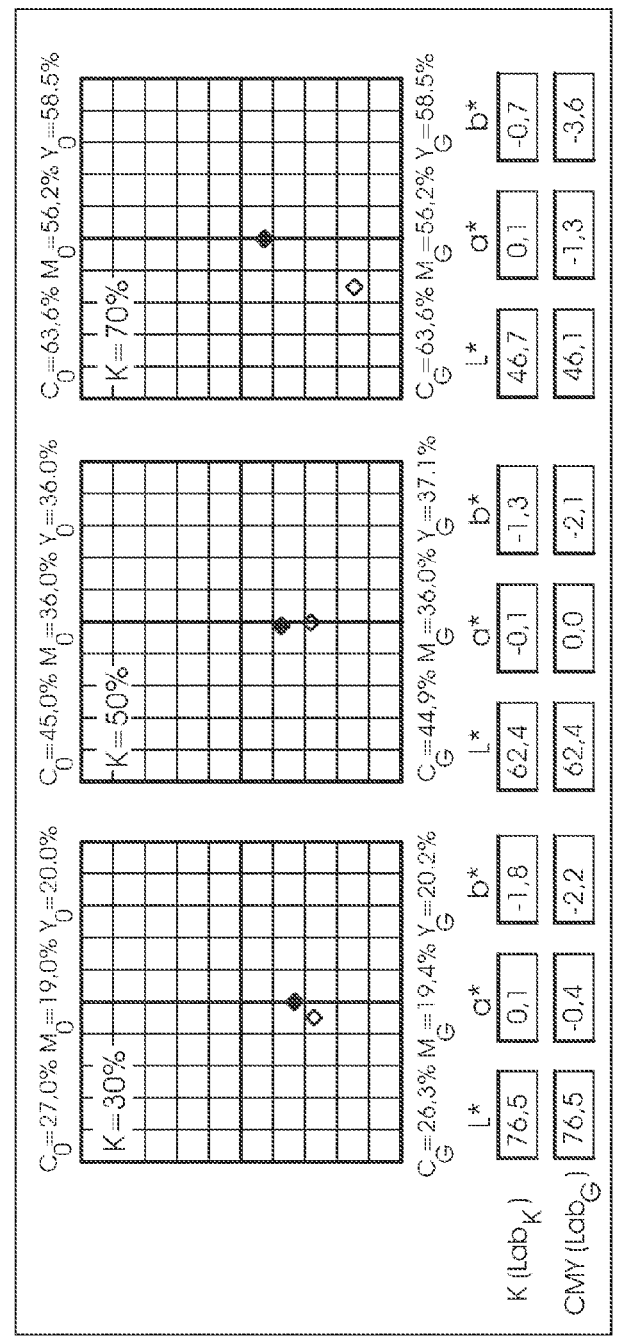
FIG. 3 is a table illustrating color loci of black and chromatic gray areas.

The color loci $Lab_K$ and $Lab_G$ for the respective black areas 15, 15', 15" and chromatic gray areas 14, 14', 14" of individual gray balance areas 11, 12, 13 with half-tones of 30%, 50% and 70% for the black printing ink (K) are illustrated in FIG. 3, with at least the representation of the L axis of the device-independent CIELab color space having been omitted.

The associated gray balance areas 11, 12, 13 are illustrated in FIG. 2. The process control strip 10 shown therein contains at least three gray balance areas 11, 12, 13. Each gray balance area 11, 12, 13 is subdivided into a chromatic gray area 14, 14', 14" and a black area 15, 15', 15". In the literature, such black areas 15, 15', 15" are also designated as true gray areas or simply gray areas, since they are built up exclusively from the black printing ink K.

In the example shown in FIG. 2 of part of a process control strip 10, the gray balance area 11 corresponds to a tonal value of the black printing ink (K) of 70%, the gray balance area 12 of 50% and the gray balance area 13 of 30%. In general, the configuration of three such gray balance areas 11, 12, 13 is sufficient to determine and correct the gray balance of the printing process. Should better and finer resolution be desired or necessary, then it is primarily advantageous to provide further gray balance areas 11, 12, 13 in the region of low tonal values and medium tonal values of the black printing ink.

The black areas 15, 15', 15" are formed directly from the predefinition for the gray balance areas 11, 12, 13 through the use of a corresponding tonal value of the black printing ink. The tonal value combinations ($C_0$, $M_0$, $Y_0$) to be predefined of the colored printing inks CMY which correspond to the intended color value of the corresponding tonal value of the color black are determined from the first color profile. The tonal value combinations ($C_0$, $M_0$, $Y_0$) determined in this way for the colored printing inks CMY are indicated in FIG. 3 above the diagrams for the actual color loci $Lab_K$ of the black areas 15, 15', 15" and $Lab_G$ of the chromatic gray areas 14, 14', 14". For the black area having the tonal value 30% for K, the result is thus a tonal value combination ($C_0$, $M_0$, $Y_0$) of (C, M, Y)=(27, 19, 10).

This tonal value combination can be determined iteratively, for example, by the intended color value for the black area 15, 15', 15" in the device-independent color space Lab being determined from the first color profile and, beginning from a starting point (C, M, Y)=(30, 30, 30), individual tonal values of the printing inks always being varied, in each case the device-independent color value being determined through the first color profile, a difference between the color value determined and the predefined intended color value of the tonal value of the color black being determined and minimized by the variations. Once the difference is equal to zero or smaller than a limiting value, then the desired tonal value combination ($C_0$, $M_0$, $Y_0$) has been found.

In step S9, starting from the chromatic gray and black area 14, 14', 14", 15, 15', 15" formed under the above conditions, the associated actual color values $Lab_K$ and $Lab_G$ are then determined. These actual color values $Lab_K$ and $Lab_G$ are listed in FIG. 3 under the representation of the color loci in an ab coordinate system.

Figures 4, 5:
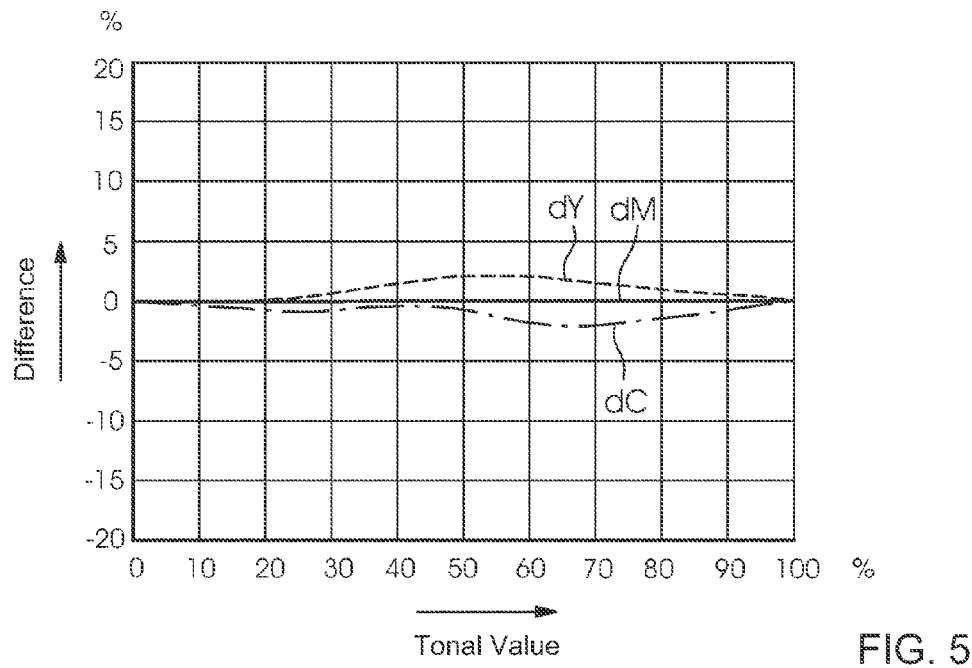
FIG. 4 is a table illustrating deviations of actual tonal value combinations of the chromatic gray areas.
FIG. 5 is a diagram illustrating an adapted course of the differences of the tonal value combinations of color and black areas.

In order to determine the tonal value combinations ($C_K$, $M_K$, $Y_K$), ($C_G$, $M_G$, $Y_G$) of the black area 15, 15', 15" and of the chromatic gray area 14, 14', 14" of the gray balance area 11, 12, 13, the gray balance area 11, 12, 13 is measured colorimetrically in step S9. In this way, color loci $Lab_K$ and $Lab_G$ are given for the different chromatic gray areas 14, 14', 14" and for the black areas 15, 15', 15" in the device-independent color space. As already described above, beginning from a starting point from the first color profile, in each case a tonal value combination which corresponds to the measured color loci is determined. These tonal value combinations ($C_G$, $M_G$, $Y_G$) are illustrated in FIG. 4 in the table under Process Values for chromatic gray areas 14, 14', 14" which correspond to the black areas 15, 15', 15" having tonal values of K=30%, 50% and 70%. For comparison, the predefined first tonal value combination $C_0$, $M_0$, $Y_0$=$C_{ref}$, $M_{ref}$, $Y_{ref}$ determined as above is indicated in the left-hand table under Reference Values.

Starting from the second and third tonal value combinations ($C_K$, $M_K$, $Y_K$), ($C_G$, $M_G$, $Y_G$) of the actual color values determined in this way, in the next step S10 the differences between the respective tonal values of the printing inks CMY of the black and chromatic gray areas 14, 15, 14', 15', 14", 15" associated with one another are determined. To this end, in each case the tonal value of the respective printing ink in the black area 15, 15', 15" is subtracted from the corresponding tonal value in the chromatic gray area 14, 14', 14":

$$dC=C_G-C_K$$

$$dM=M_G-M_K$$

$$dY=Y_G-Y_K$$

The combination of tonal value differences (dC, dM, dY) determined in this way is used in the following step S12 to calculate corrected measured values ($C_{M,corr}$, $M_{M,corr}$, $Y_{M,corr}$).

In order to calculate corrected measured values ($C_{M,corr}$, $M_{M,corr}$, $Y_{M,corr}$) in step S12 which, in a subsequent pass of the method, can lead to a new profile creation in step S4, first of all, in a prior method step S11, first measured values ($C_M$, $M_M$, $Y_M$) must be determined from the predefined first process calibration. For this purpose, from the first process calibration, which corresponds to a specific printing condition, the intended tonal values ($C_0$, $M_0$, $Y_0$) are used to calculate the tonal values which have already resulted in step S1 as actual tonal values from the characterization data 2. These first measured values ($C_M$, $M_M$, $Y_M$) are therefore assigned firstly to the predefined intended tonal values ($C_0$, $M_0$, $Y_0$) of the first color profile, in this case the tonal value gains of the process calibration in the first step S1 having to be used in each case as a basis. Taking into account the tonal value gain from the first process calibration in step S1, the first measured values ($C_M$, $M_M$, $Y_M$) can therefore be calculated in step S11 from the predefined tonal values ($C_0$, $M_0$, $Y_0$) from the first color profile. The first measured values ($C_M$, $M_M$, $Y_M$) calculated in this way are used, together with the differences of the tonal values (dC, dM, dY), to calculate the corrected measured values ($C_{M,corr}$, $M_{M,corr}$, $Y_{M,corr}$) in step S12. The first measured values ($C_M$, $M_M$, $Y_M$), which correspond to the intended tonal values of the first color profile from which the chromatic gray areas 14, 14', 14" are then created, are then corrected by correct-sign addition to the differences from step S10, so that corrected measured values ($C_{M,corr}$, $M_{M,corr}$, $Y_{M,corr}$) for use in the subsequent second process calibration are used as measured values of the intended tonal values ($C_0$, $M_0$, $Y_0$).

Therefore, from three measured gray balance areas 11, 12, 13 there result for each colored printing ink CMY exactly three corrected measured values ($C_{M,corr}$, $M_{M,corr}$, $Y_{M,corr}$), which are available for use in a new process calibration in step S1. In order to also correct the remaining first measured values ($C_M$, $M_M$, $Y_M$), which have heretofore not been corrected in this way by this method, provision is further made for corrected measured values ($C_{M,corr}$, $M_{M,corr}$, $Y_{M,corr}$) to be determined in relation to these measured values ($C_M$, $M_M$, $Y_M$). For this purpose, for each individual printing ink CMY, differences dC, dM, dY are determined through the use of interpolation between the determined differences. In this case, a boundary condition that the differences for a tonal value of 0% and a tonal value of 100% are in each case zero is predefined. One possible interpolation method is a linear method, with it being possible in this case for jumps to occur as a result of the measured values. Therefore, in particular, spline methods or matching with polynomials are preferred. One example of a curve for the colored printing inks CMY is shown in FIG. 5. In this way, a complete set of corrected measured values ($C_{M,corr}$, $M_{M,corr}$, $Y_{M,corr}$) can be created in step S12. These are then supplied, together with the printing conditions, as new characterization data to a second process calibration in step S1. On the basis of this process calibration, a new profile creation for a second color profile with a corrected gray balance can then be carried out in step S4. Further printing plates can then be produced in step S5 and, in step S6, can then be used for the renewed printing of sheets in a printing press for new print jobs with the same printing conditions. The creation of a new color profile is not absolutely necessary for this purpose. It is sufficient if the second process calibration from step S1 is now used for further imaging of printing plates and to this extent step S4 can also be skipped. The quality of the printed images should then be qualitatively better, in particular in the gray balance area.

In this way, in particular under identical printing conditions, the gray balance for successive printing processes for producing different printed images in different print jobs can always be improved further in that, during following print jobs, correction of the gray balance on the basis of the gray balance areas 11, 12, 13 used in the process control strip 10 of the printing plates is evaluated in step S5 and is used for profile creation in step S4 and for renewed process calibration in step S1. Whereas, conventionally, further initial printing of test forms is needed to profile the printing process, this renewed initial printing can now be avoided by the method described, by the corrected measured values being calculated. The second process calibration is carried out directly by evaluating process control strips during a printing process by using the predefined first process calibration and the first predefined color profile.

The invention claimed is:

1. A method for correcting the gray balance of a printing process, in which printing forms allocated to color separations are imaged with at least one test form, the method comprising the following steps:
   printing at least one printing material in a printing press with the printing forms, using at least three colored printing inks and a black printing ink;
   colorimetrically measuring the test form printed onto the printing material, with the test form including at least one gray balance area having a chromatic gray area and a black area and the chromatic gray area being formed from the colored printing inks in accordance with a first tonal value combination;
   providing the first tonal values of the chromatic inks in the combination according to a first predefined color profile with the same intended color value as the black area;
   creating the first predefined color profile in accordance with a predefined first printing condition of a predefined printing process following a first process calibration;
   determining actual color values of the black area and of the chromatic gray area of the at least one gray balance area;
   determining a second tonal value combination of the printing inks in accordance with the first predefined color profile by using the actual color value of the black area;
   determining a third tonal value combination of the printing inks in accordance with the first predefined color profile by using the actual color value of the chromatic gray area;
   determining first measured values of the first predefined process calibration corresponding to predefined tonal values, while taking the first printing condition into account;
   determining corrected measured values for at least a part of the first measured values, by using the second and third tonal value combinations;
   replacing at least the part of the first measured values with the corrected measured values; and
   carrying out a second process calibration by using the corrected measured values and taking the printing condition of the predefined printing process into account, and imaging printing forms in an imaging process according to the second process calibration for a substantially identical printing condition.

2. The method according to claim 1, which further comprises:
   forming a difference value for each printing ink by forming a difference between the second and third tonal value combinations; and
   determining a corrected measured value for the second process calibration on a basis of the difference value.

3. The method according to claim 2, which further comprises determining the corrected measured value for the second process calibration by using an addition to a first measured value.

4. The method according to claim 1, which further comprises:
   generating a second profile by using the second process calibration;
   determining tonal value combinations for a desired color value by using the second profile;
   producing color separations according to printing originals in accordance with the second profile;
   imaging printing forms in accordance with the color separations; and
   carrying out a printing process using the printing forms in which printing inks are transferred directly or indirectly from the printing forms to a printing material.

5. The method according to claim 1, wherein the second tonal value combination and the third tonal value combination each include only tonal values for non-black colored printing inks.

6. The method according to claim 1, which further comprises calculating the first measured values from the first process calibration by using at least one item of information including a tonal value gain curve and a tonal value curve from the process calibration.

* * * * *